United States Patent
Black

(10) Patent No.: US 9,140,284 B2
(45) Date of Patent: Sep. 22, 2015

(54) METHOD FOR INSTALLING WORK-PIECE TO MATING STRUCTURE, AND APPARATUS

(71) Applicant: Honda Motor Co., Ltd., Tokyo (JP)

(72) Inventor: Dave Black, New Lowell (CA)

(73) Assignee: Honda Motor Co., Ltd., Tokyo (JP)

( * ) Notice: Subject to any disclaimer, the term of this patent is extended or adjusted under 35 U.S.C. 154(b) by 95 days.

(21) Appl. No.: 13/750,562

(22) Filed: Jan. 25, 2013

(65) Prior Publication Data

US 2014/0208563 A1    Jul. 31, 2014

(51) Int. Cl.
- *B62D 27/00* (2006.01)
- *B23P 11/00* (2006.01)
- *F16B 19/02* (2006.01)
- *B60Q 1/04* (2006.01)

(52) U.S. Cl.
CPC . *F16B 19/02* (2013.01); *B60Q 1/04* (2013.01); *Y10T 29/4981* (2015.01); *Y10T 29/49902* (2015.01); *Y10T 403/20* (2015.01)

(58) Field of Classification Search
CPC ....... F16B 19/02; B60Q 1/04; Y10T 29/4981; Y10T 403/20; Y10T 29/49902; Y10T 29/49622; Y10T 29/49826; Y10T 29/49813; Y10T 29/49824; Y10T 29/49861; Y10T 29/49901; Y10T 29/49904; Y10T 29/49908

USPC ............ 29/423, 468, 426.1, 426.4, 467, 466, 29/464, 407.09, 897.2; 403/27; 362/520, 362/487

See application file for complete search history.

(56) References Cited

U.S. PATENT DOCUMENTS

| | | | |
|---|---|---|---|
| 5,268,825 A | 12/1993 | Blancheton | |
| 5,383,987 A | 1/1995 | Kreis et al. | |
| 6,290,287 B1 | 9/2001 | Guyomard | |
| 8,020,913 B2 * | 9/2011 | Kwolek | 296/70 |
| 8,845,128 B2 * | 9/2014 | Pickholz | 362/235 |
| 2005/0121930 A1 | 6/2005 | Ling et al. | |

FOREIGN PATENT DOCUMENTS

EP     1939076 A1    7/2008

* cited by examiner

*Primary Examiner* — John C Hong

(74) *Attorney, Agent, or Firm* — Standley Law Group LLP

(57) ABSTRACT

An apparatus that includes a datum. The datum has a first portion configured to interface with a work-piece having a critical surface associated with a fit-and-finish surface, and a second portion configured to interface with a mating structure. The datum is adjusted in such a way that the datum facilitates placement of the critical surface within acceptable tolerance to the fit-and-finish surface once the datum is placed between the work-piece and the mating structure, and the work-piece is installed to the mating structure.

20 Claims, 10 Drawing Sheets

KNOWN WORK-PIECE

KNOWN WORK-PIECE

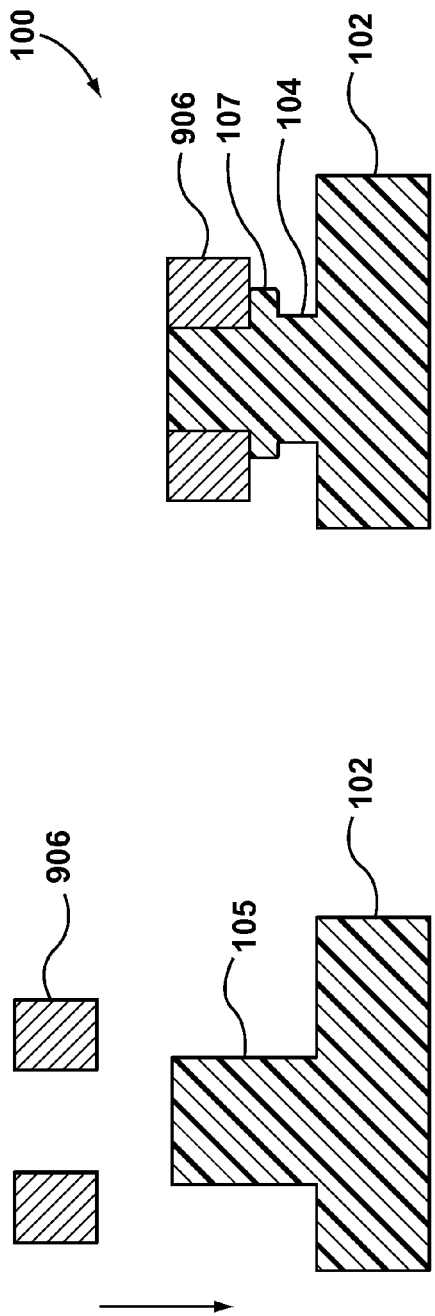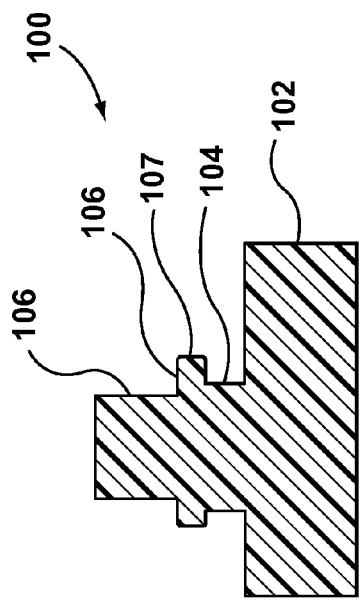
FIG. 15A
FIG. 15B
FIG. 15C

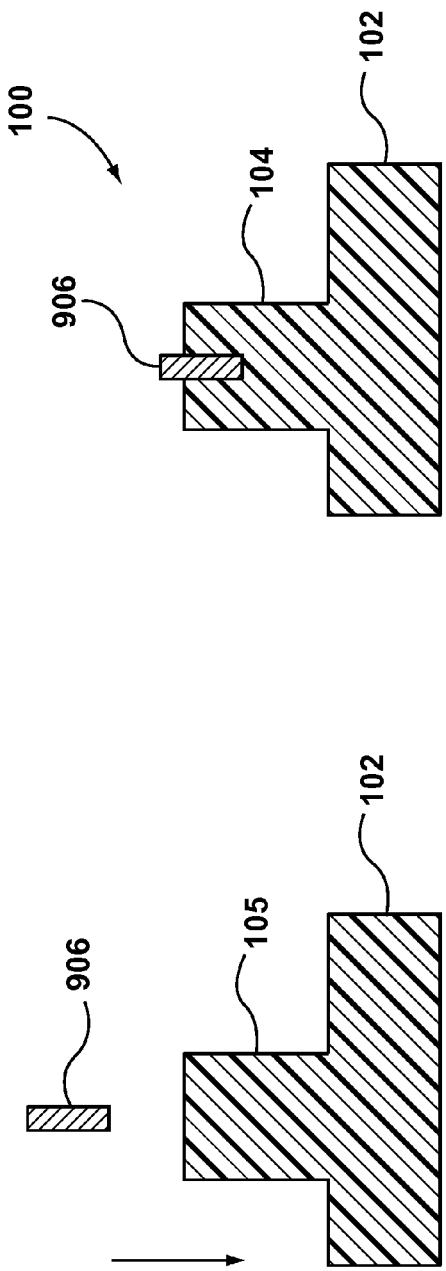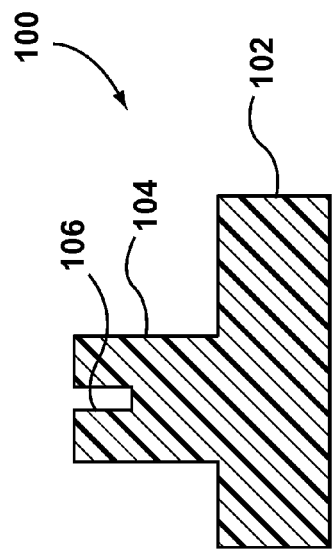

METHOD FOR INSTALLING WORK-PIECE TO MATING STRUCTURE, AND APPARATUS

TECHNICAL FIELD

Embodiments of the invention generally relate to a method and an associated apparatus for installing a work-piece to a mating structure.

BACKGROUND

A work-piece may be defined as an object, assembly, etc., that is worked on with a tool or machine. One example of a work-piece is a headlight assembly.

A mating structure, for purposes of the invention, may be defined as a structure that is to be mated (joined, installed) to the work-piece. An example of a mating structure is a vehicle (such as a car or truck).

SUMMARY

Fit and finish pertain to the evaluative standard of a vehicle's cosmetic appearance. Good fit and finish means, for example, that (generally speaking) the body panels and trim are evenly spaced, aligned, and secure, and/or the paint is evenly applied with no bubbles or pit marks; in other words, the assemblies that have surfaces that are visible by the human eye pertain to fit and finish surfaces.

In the automobile manufacturing industry, the term fit and finish refers to the way the parts of a car go together. For example, the hood should join smoothly with the fender of the car, so that neither sticks out and the gaps between them are barely visible. The paint job should be smooth and even, with no unintended variations in color. The upholstery should sit firmly on the seats with no untrimmed edges. The doors should close tightly. If these things (amongst other things) are so, the car has a perfect fit and finish, and that means a lot.

When a customer looks at a car with an eye toward buying it, he or she may not consciously notice the fit and finish. In fact, chances are good that the potential buyer may be more concerned over what kind of mileage the car gets or how powerful the engine is. However, there is an unconscious visual assessment of the entire vehicle underway as the potential buyer inspects the car. On some level the buyer is aware that if the manufacturer got the fit and finish right, then they care about details and probably got other things right as well.

An imperfect fit and finish can hurt sales of cars. So there are entire departments at car manufacturers that work almost exclusively with fit and finish issues, using sophisticated, high-tech machinery that analyzes the way parts fit together on the level of one or two millimeters. The machinery used on modern assembly lines to analyze fit and finish may include laser beams, robotic eyes, and a combination of humans and computers doing the actual final inspection. In recent years, the auto industry has partnered with the National Institute for Standards and Technology (NIST) to improve its ability to measure fit and finish.

It would be a serious misstep to not pay enough attention to quality control issues like fit and finish. Controlling fit and finish issues may be usually addressed by applying stringent quality control measures to make sure cars have acceptable fit and finish. Major auto makers have quality control departments, often staffed by experts in metrology, the science of measurement. These experts have brought with them sophisticated measuring tools that can check (almost instantly) the precise dimensions of cars and sub-assemblies as they move down the production line. The most advanced of these tools use laser triangulation to produce a three-dimensional model of the components, so that they can be checked by a computer (or by a human computer operator) to determine if, say, a door doesn't close tightly enough. If so, the entire assembly line can be shut down until someone determines what went wrong and fix the problem. These laser scanners can be attached to robotic arms in the factory so that they can perform their job without a human being present. They can detect small variations based on a predefined CAD (computer-aided-design) model already stored in the computer's memory.

In the late 1990s, the American auto industry joined forces with the National Institute for Standards and Technology (NIST; formerly the Bureau of Standards) to produce what was known as the "2-millimeter assembly process," which could hold dimensional variations in auto assembly, which had previously been accurate only within 5 or 6 millimeters, to within less than 2 millimeters. The result, according to some observers, was an immediate improvement in the fit and finish of cars.

Fit and finish isn't just about perceived quality, of course. If there's a gap between the door and the rest of the car's body, air can come whistling through noisily as you drive and produce a chilling interior wind in cold weather. And rain can leak into the car, damaging the upholstery or getting passengers wet. It can even ruin the aerodynamic profile of the vehicle. So poor fit and finish has very practical consequences, too. Automobile manufacturers should (therefore) not ignore fit and finish issues.

The present invention mitigates the above-described problems. To this end, the invention includes embodiments of an apparatus and associated methods of using said apparatus to mitigate the aforementioned problems.

One aspect of the invention includes an apparatus having a work-piece. The work-piece has a critical surface associated with a fit-and-finish surface. The apparatus also includes a mating structure. The apparatus also includes a datum having a first portion interfaced with the work-piece. The datum also has a second portion interfaced with the mating structure. The datum is adjusted in such a way that the datum facilitates placement of the critical surface within acceptable tolerance to the fit-and-finish surface once (A) the datum is placed between the work-piece and the mating structure, and (B) the work-piece is installed to the mating structure.

Another aspect of the invention includes an apparatus having a datum. The datum has a first portion configured to interface with a work-piece having a critical surface associated with a fit-and-finish surface. The datum also has a second portion configured to interface with a mating structure. The datum is adjusted in such a way that the datum facilitates placement of the critical surface within acceptable tolerance to the fit-and-finish surface once (A) the datum is placed between the work-piece and the mating structure, and (B) the work-piece is installed to the mating structure.

Another aspect of the invention includes an apparatus having a work-piece with a critical surface associated with a fit-and-finish surface. The apparatus also includes a datum having a first portion interfaced with the work-piece. The datum also has a second portion configured to interface with a mating structure. The datum is adjusted in such a way that the datum facilitates placement of the critical surface within acceptable tolerance to the fit-and-finish surface once (A) the datum is placed between the work-piece and the mating structure, and (B) the work-piece is installed to the mating structure.

Another aspect of the invention includes an apparatus having a mating structure. The apparatus also includes a datum. The datum has a first portion configured to interface with a work-piece having a critical surface associated with a fit-and-finish surface. The datum also has a second portion interfaced with the mating structure. The datum is adjusted in such a way that the datum facilitates placement of the critical surface within acceptable tolerance to the fit-and-finish surface once (A) the datum is placed between the work-piece and the mating structure, and (B) the work-piece is installed to the mating structure.

Another aspect of the invention includes a method for use with a work-piece. The work-piece has a critical surface associated with a fit-and-finish surface, and with a mating structure. The method includes interfacing a first portion of a datum with the work-piece. The method also includes interfacing a second portion of the datum with the mating structure. The method also includes adjusting the datum in such a way that the datum facilitates placement of the critical surface within acceptable tolerance to the fit-and-finish surface once (A) the datum is placed between the work-piece and the mating structure, and (B) the work-piece is installed to the mating structure.

Another aspect of the invention includes a method for installing a work-piece to a mating structure. The method includes adjusting a datum of the work-piece in such a way that the datum, once so adjusted, provides a datum feature within acceptable tolerance. The datum feature is positionable against a datum interface of the mating structure in such a way that the datum interface is set apart from a fit-and-finish surface and from a critical surface of the work-piece within acceptable tolerance once the datum feature is so positioned against the datum interface. The datum feature and the datum interface cooperate with each other in such a way that once the work-piece is installed to the mating structure, a critical surface of the work-piece is within acceptable tolerance relative to a fit-and-finish surface associated with the critical surface.

Another aspect of the invention includes a method for installing a work-piece to a mating structure. The method includes positioning, within acceptable tolerance, a critical surface of the work-piece against a fit-and-finish surface of a nesting fixture in such a way that the critical surface is acceptably oriented relative to the fit-and-finish surface once so positioned. The method further includes adjusting, once the critical surface is positioned and acceptably oriented relative to the fit-and-finish surface, a datum of the work-piece in such a way that the datum, once so adjusted, provides a datum feature within acceptable tolerance. The method includes positioning the datum feature against a datum interface of the mating structure in such a way that the datum interface is set apart from the fit-and-finish surface and from the critical surface within acceptable tolerance once the datum feature is so positioned against the datum interface. The datum feature and the datum interface cooperate with each other in such a way that once the work-piece is installed to the mating structure, a critical surface of the work-piece is within acceptable tolerance relative to a fit-and-finish surface associated with the critical surface.

Another aspect of the invention includes an apparatus. The apparatus includes a mating structure and a work-piece. The mating structure has a datum interface. The work-piece has a critical surface and a datum adjusted in such a way that the datum, once so adjusted, provides a datum feature within acceptable tolerance. The datum feature is positionable against the datum interface of the mating structure in such a way that the datum interface is set apart from a fit-and-finish surface and from the critical surface within acceptable tolerance once the datum feature is so positioned against the datum interface. The datum feature and the datum interface cooperate with each other in such a way that once the work-piece is installed to the mating structure, a critical surface of the work-piece is within acceptable tolerance relative to a fit-and-finish surface associated with the critical surface.

Another aspect of the invention includes an apparatus for use with a mating structure having a datum interface. The apparatus includes a work-piece having a critical surface and a datum. The datum is adjusted in such a way that the datum, once so adjusted, provides a datum feature within acceptable tolerance. The datum feature is positionable against the datum interface of the mating structure in such a way that the datum interface is set apart from a fit-and-finish surface and from the critical surface within acceptable tolerance once the datum feature is so positioned against the datum interface. The datum feature and the datum interface cooperate with each other in such a way that once the work-piece is installed to the mating structure, a critical surface of the work-piece is within acceptable tolerance relative to a fit-and-finish surface associated with the critical surface.

Another aspect of the invention includes an apparatus for use with a mating structure having a datum interface, and with a work-piece having a critical surface. The apparatus includes a datum. The datum is configured to be attached to the work-piece so as to extend from the work-piece. The datum is also configured to be adjusted in such a way that the datum, once so adjusted, provides a datum feature within acceptable tolerance. The datum feature is positionable against the datum interface of the mating structure in such a way that the datum interface is set apart from a fit-and-finish surface and from the critical surface within acceptable tolerance once the datum feature is so positioned against the datum interface. The datum feature and the datum interface cooperate with each other in such a way that once the work-piece is installed to the mating structure, a critical surface of the work-piece is within acceptable tolerance relative to a fit-and-finish surface associated with the critical surface.

Another aspect of the invention includes an apparatus including a mating structure and a work-piece. The mating structure has a datum interface. The work-piece has a critical surface and a datum. The critical surface is positionable, within acceptable tolerance, against a fit-and-finish surface of a nesting fixture in such a way that the critical surface is acceptably oriented relative to the fit-and-finish surface once so positioned. The datum has a datum feature. The datum is adjustable, once the critical surface is positioned and acceptably oriented relative to the fit-and-finish surface, in such a way that the datum, once so adjusted, provides the datum feature within acceptable tolerance. The datum feature is positioned against the datum interface of the mating structure in such a way that the datum interface is set apart from the fit-and-finish surface and from the critical surface within acceptable tolerance once the datum feature is so positioned against the datum interface. The datum feature and the datum interface cooperate with each other in such a way that once the work-piece is installed to the mating structure, a critical surface of the work-piece is within acceptable tolerance relative to a fit-and-finish surface associated with the critical surface.

Another aspect of the invention includes an apparatus for use with a mating structure having a datum interface. The apparatus includes a work-piece. The work-piece has a critical surface and a datum. The critical surface is positionable, within acceptable tolerance, against a fit-and-finish surface of a nesting fixture in such a way that the critical surface is acceptably oriented relative to the fit-and-finish surface once so positioned. The datum has a datum feature. The datum is adjustable, once the critical surface is positioned and acceptably oriented relative to the fit-and-finish surface, in such a way that the datum, once so adjusted, provides the datum feature within acceptable tolerance. The datum feature is positioned against the datum interface of the mating structure in such a way that the datum interface is set apart from the fit-and-finish surface and from the critical surface within acceptable tolerance once the datum feature is so positioned against the datum interface. The datum feature and the datum interface cooperate with each other in such a way that once the work-piece is installed to the mating structure, a critical surface of the work-piece is within acceptable tolerance relative to a fit-and-finish surface associated with the critical surface.

Another aspect of the invention includes an apparatus for use with a mating structure having a datum interface, and for use with a work-piece having a critical surface positionable, within acceptable tolerance, against a fit-and-finish surface of a nesting fixture in such a way that the critical surface is acceptably oriented relative to the fit-and-finish surface once so positioned. The apparatus includes a datum. The datum is configured to be attached to the work-piece so as to extend from the work-piece. The datum has a datum feature. The datum is adjustable, once the critical surface is positioned and acceptably oriented relative to the fit-and-finish surface, in such a way that the datum, once so adjusted, provides the datum feature within acceptable tolerance. The datum feature is positioned against the datum interface of the mating structure in such a way that the datum interface is set apart from the fit-and-finish surface and from the critical surface within acceptable tolerance once the datum feature is so positioned against the datum interface. The datum feature and the datum interface cooperate with each other in such a way that once the work-piece is installed to the mating structure, a critical surface of the work-piece is within acceptable tolerance relative to a fit-and-finish surface associated with the critical surface.

Another aspect of the invention includes an apparatus for use with a mating structure, and with a work-piece having a critical surface and having the datum interface. The apparatus includes the datum. The datum is configured to be attached to the mating structure so as to extend from the mating structure. The datum is also configured to be adjusted in such a way that the datum, once so adjusted, provides a datum feature within acceptable tolerance. The datum feature is positionable against the datum interface of the work-piece in such a way that the datum interface is set apart from a fit-and-finish surface and from the critical surface within acceptable tolerance once the datum feature is so positioned against the datum interface. The datum feature and the datum interface cooperate with each other in such a way that once the work-piece is installed to the mating structure, a critical surface of the work-piece is within acceptable tolerance relative to a fit-and-finish surface associated with the critical surface.

Another aspect of the invention includes a method including: (A) associating the mating structure with a corresponding fit-and-finish surface, and the mating structure is not properly positioned relative to the corresponding fit-and-finish surface, and the mating structure cannot be repositioned and is fixedly connected to a surrounding environment, and the mating structure is positioned relative to the corresponding fit-and-finish surface in such a way that the mating structure has unacceptable tolerance which cannot be changed and must be accepted as is without further amendments to the mating structure relative to the corresponding fit-and-finish surface, and (B) adjusting the datum in such a way as to maintain the relationship between the fit-and-finish surface of the work-piece relative to the corresponding fit-and-finish surface of the mating structure.

Other aspects and features of the non-limiting embodiments will become apparent to those skilled in the art upon review of the following detailed description of the non-limiting embodiments with the accompanying drawings.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIGS. 14A, 14B, 14C, 15A, 15B, 15C, 16A, 16B, 16C depict example representations of adjusting a datum of the work-piece of FIG. 8.

Figure 1A:
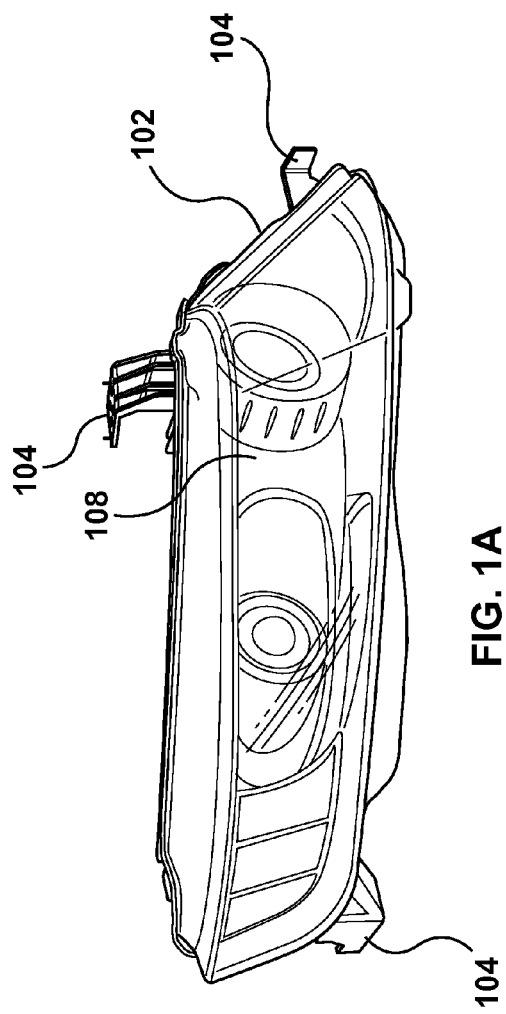
FIGS. 1A and 1B depict a perspective view of an example of a work-piece.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF EXEMPLARY EMBODIMENT(S)

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the examples as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments (examples), aspects and/or concepts defined in the appended claims. Hence, specific dimensions and other physical characteristics relating to the embodiments disclosed herein are not to be considered as limiting, unless the claims expressly state otherwise.

Figure 1B:
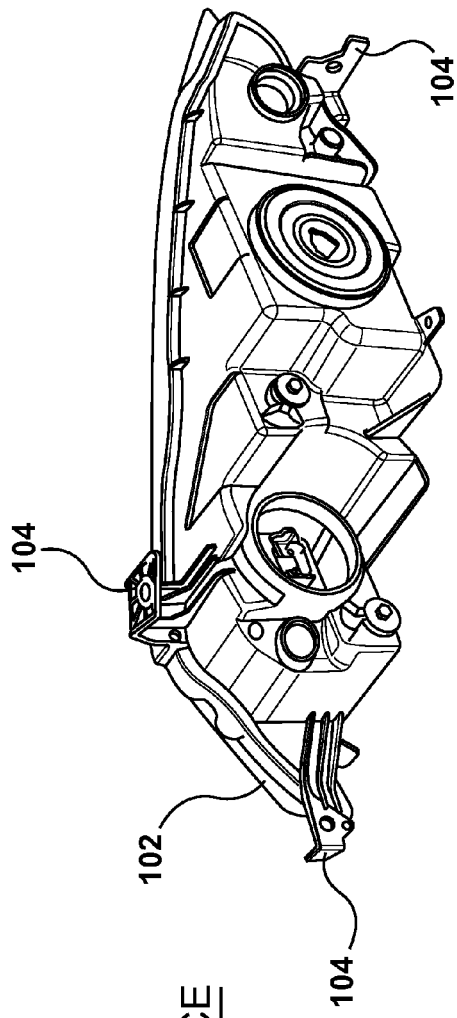

FIGS. 1A and 1B depict a perspective view of one example of a work-piece 102. FIGS. 1A and 1B depict the work-piece 102 uninstalled (yet to be installed to a mating structure).

On the one hand, FIG. 1A depicts a front view that is viewed by a person for the case where the work-piece 102 is installed to a mating structure (not depicted in FIG. 1A). The work-piece 102 provides or includes a critical surface 108 that is viewed by a person once the work-piece 102 is installed to the mating structure. By way of example, the work-piece 102 includes a headlamp assembly, also called a headlamp module, that is installable in a vehicle (car and/or truck). The work-piece 102 includes a critical surface 108, such as a lens surface of a light fixture. The work-piece 102 may include an interior component that is installable in an interior passenger cabin of a vehicle such as a car or truck. The work-piece 102 includes a structure that is viewed by a person once installed to the mating structure. The critical surface 108 is a surface of the work-piece 102 that determines the appropriate work-holder design.

On the other hand, FIG. 1B depicts a back view that is not normally seen by a person once the work-piece 102 is installed to the mating structure (not depicted in FIG. 1B). The work-piece 102 provides, for example, three instances of a datum 104 configured to be interfaced to the mating structure. The datum 104 may include a datum structure for each of T, B, H (the x-axis, the y-axis, the z-axis). The datum 104 may be called a "datum reference". The datum 104 is used for geometric dimensioning and tolerancing (GD&T). Each instance of the datum 104 provides surfaces that respectively abut respective surfaces of the mating structure; for example, the instances of the datum 104 are aligned along a respective one of the x-axis, the y-axis, and the z-axis.

In GD&T, the datum reference frames may be 3D (three dimensional). Datum reference frames may be used as part of a feature control frame to show where a measurement is taken from. A datum reference frame may be made up of three planes. For example, the three planes may be one "face side" and two "datum edges". These three planes are marked A, B and C, where A is the face side, B is the first datum edge, and C is the second datum edge. In this case, the datum reference frame is A/B/C. A/B/C is shown at the end of the feature control frame to show from where the measurement is taken. Reference is made to the ASME standard Y14.5M-1994 for more examples and material modifiers. The engineer may select A/B/C based on the dimensional function of the part. The datum may be functional per the ASME standard. A part, such as the work-piece 102, may be required to fit with other parts (such as a mating structure). The functional datum may be chosen (selected) based on how the part attaches. The functional datum do not have to be used to manufacture the part. The manufacturing datum may be different than the functional datum to reduce cost, improve process speed and repeatability (if so required). A tolerance analysis may be needed in some cases to convert between the functional datum and the manufacturing datum. Computer software may be used for dimensional analysis.

Figure 2:
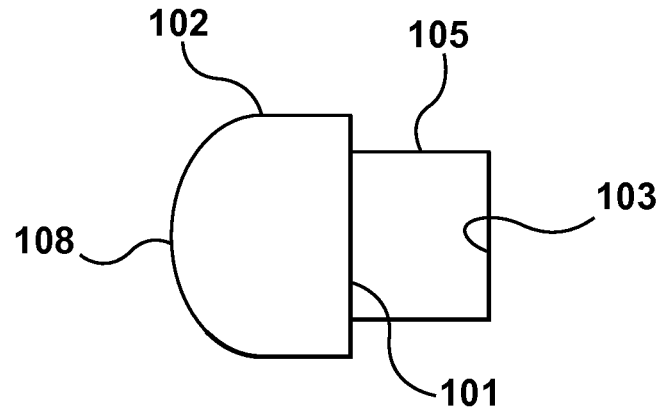
FIG. 2 depicts a schematic representation of the work-piece of FIGS. 1A and 1B.

FIG. 2 depicts the schematic representation of the work-piece 102 of FIGS. 1A and 1B.

Figure 3:
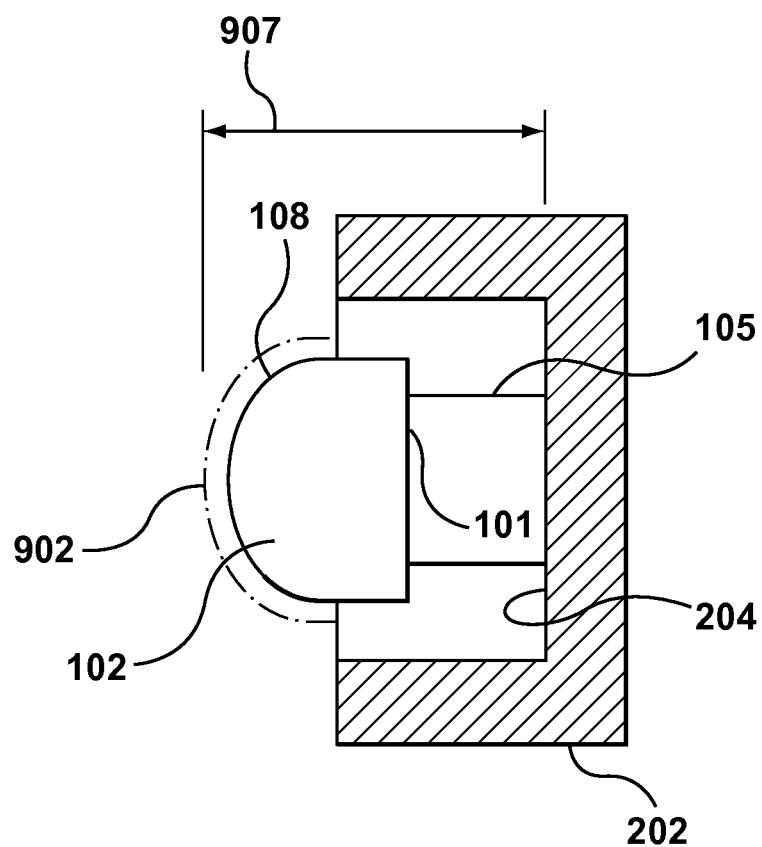
FIGS. 3 to 13 depict schematic representations of various states of installation of a mating structure to the work-piece of FIG. 2.

FIGS. 2 and 3 depict the schematic representations of the installation of the work-piece 102 to the mating structure 202 of FIG. 3.

The unadjusted datum 105 is depicted. The unadjusted datum 105 will be adjusted (modified, etc.) so as to form the datum 104 as depicted in FIGS. 1A, 1B, 7, 8, and 9 (for example).

The work-piece 102 includes the critical surface 108 oriented in a direction, and also includes at least one or more instances of the unadjusted datum 105 that is set apart from the critical surface 108. It will be appreciated that the unadjusted datum 105 may be configured for attachment to the work-piece 102, or the unadjusted datum 105 extends from the work-piece 102. For example, for the case where the work-piece 102 includes a molded article or an injection-molded body, the unadjusted datum 105 extends from the body of the work-piece 102 since the unadjusted datum 105 is formed (molded) to the body. However, it will be appreciated that the unadjusted datum 105 may be attached to the work-piece 102 if so required for the case where the unadjusted datum 105 is not formed to the work-piece 102.

FIG. 3 depicts the schematic example of a combination of the work-piece 102 installed to the mating structure 202, with the unadjusted datum 105 positioned between the work-piece 102 and the mating structure 202. By way of example, the unadjusted datum 105 extends from the work-piece 102, and abuts a datum interface 204 of the mating structure 202. It will be appreciated that the opposite relationship may exist (not depicted) in which the unadjusted datum 105 extends from the mating structure 202, and the work-piece 102 provides the datum interface 204. The unadjusted datum 105 may include an x-axis datum for the x-axis, a y-axis datum for the y-axis, and a z-axis datum for the z-axis. For the sake of simplification, a single instance of the unadjusted datum 105 is depicted. The unadjusted datum 105 is configured in such a way that the unadjusted datum 105 permits the fit-and-finish surface 902 and the critical surface 108 of the work-piece 102 to be positioned within acceptable tolerance relative to each other.

FIG. 3 depicts a case for an ideal condition, in which the manufacturing and/or construction of the components of the mating structure 202, of the work-piece 102, and of the unadjusted datum 105 were accomplished so that the work-piece 102 and the mating structure 202, when assembled together, have acceptable accumulated tolerances (as a whole). For example, perhaps a combination of molding operations and gluing operations were used to manufacture and assemble the mating structure 202 and the work-piece 102 such that each of the tolerances of the components is acceptable, and the accumulated tolerance associated with the assembled components happens to be acceptable as well so that in the end, the critical surface 108 matches up with the fit-and-finish surface 902 within acceptable tolerance. However, this represents the ideal condition in which the components may be manufactured and may be assembled within tolerances; moreover, this ideal condition is not likely to exist for every day of manufacturing. It will be appreciated that manufacturing conditions may change from day to day, and these changes may not be controllable. The changing manufacturing conditions may cause variations in manufacturing tolerances that may result in components manufactured and/or assembled in such a way as to be outside of acceptable tolerances. Some of these unacceptable tolerances may be large enough such that the fit-and-finish surfaces associated with these out-of tolerance components may become inadvertently out of tolerance as well.

Figure 4:
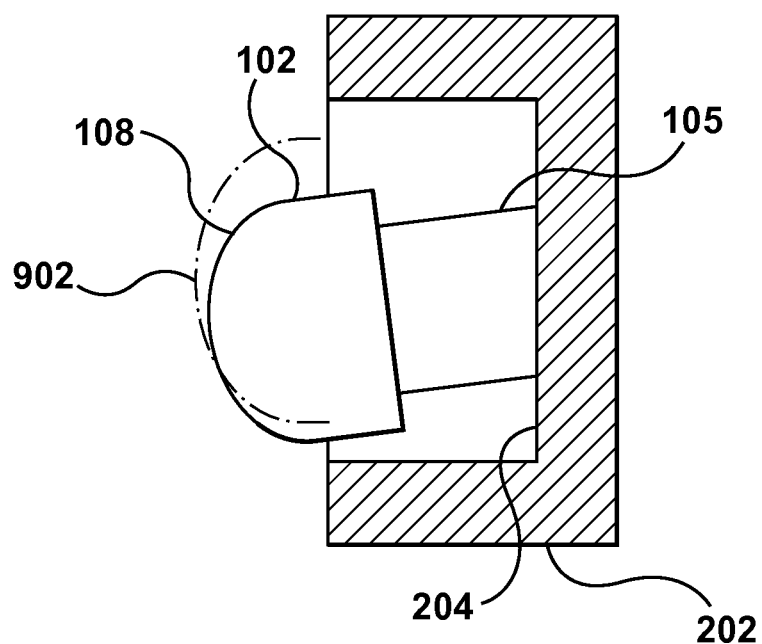

FIGS. 4 to 13 depict the schematic representations of the various states of installation of the work-piece 102 to the mating structure 202 of FIG. 4.

FIG. 4 depicts the schematic example of a case where the accumulated tolerances associated with manufacturing and assembling the components of the work-piece 102 and the mating structure 202, and/or installing the work-piece 102 to the mating structure 202 leads to an unacceptable result. The unadjusted datum 105 does not permit the work-piece 102 and the mating structure 202 to be assembled in such a way that the unadjusted datum 105 fails to permit the fit-and-finish surface 902 and the critical surface 108 of the work-piece 102 to be positioned within acceptable tolerance relative to each other. As depicted in FIG. 4, the fit-and-finish surface 902 and the critical surface 108 of the work-piece 102 are not positioned within acceptable tolerance relative to each other. Perhaps the individual tolerances of the components are within acceptable limits, and that the accumulation of tolerances is not within acceptable limits once the work-piece 102 is installed to the mating structure 202. The accumulation of tolerances may be called the stack-up of variances. As depicted, the critical surface 108 does not fit within acceptable tolerance relative to the fit-and-finish surface 902. As depicted, a person (consumer) may not be interested in purchasing the complete assembly as depicted because the critical surface 108 does not fit within acceptable tolerance relative to the fit-and-finish surface 902.

Figure 5:
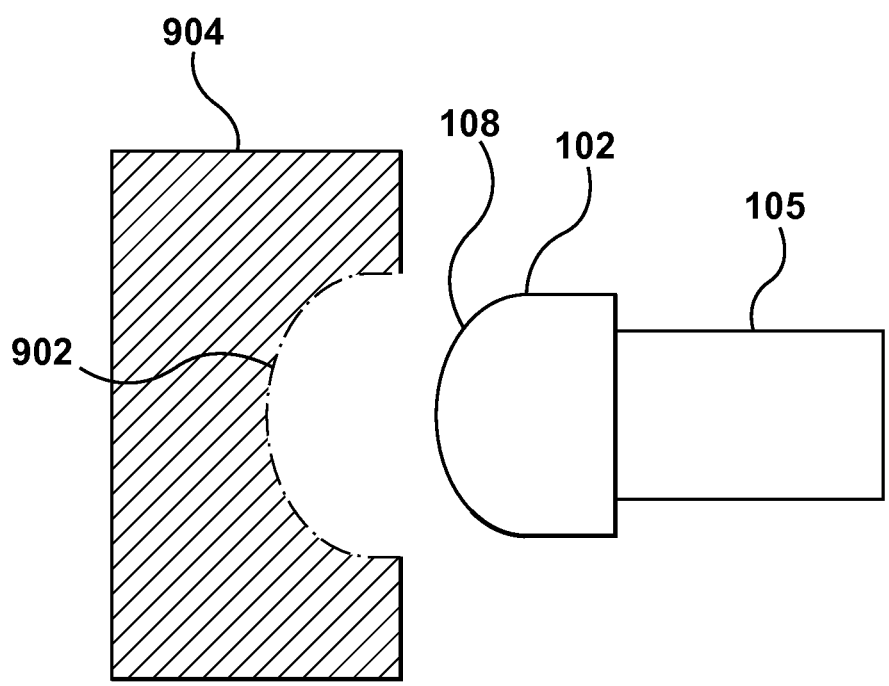

FIG. 5 depicts the schematic example of an initial operation of a method for installing the work-piece 102 to the mating structure 202. The unadjusted datum 105 extends from the work-piece 102. The critical surface 108 of the work-piece 102 is to be positioned in the fit-and-finish surface 902 that is provided by (defined by) a nesting fixture 904. Once the critical surface 108 is positioned next to (proximate to, adjacent to) the fit-and-finish surface 902, the work-piece 102 will be clamped (temporarily fixedly connected) to the nesting fixture 904.

Figure 6:
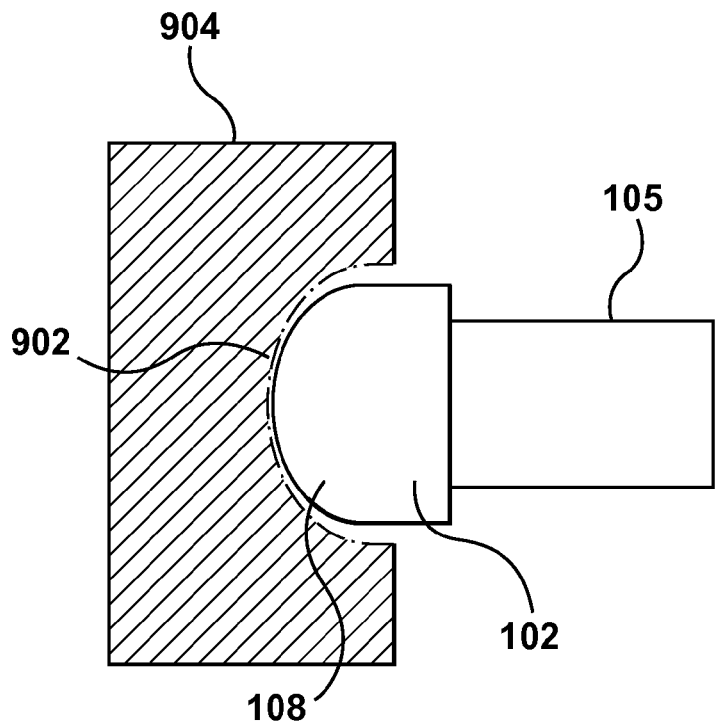

FIG. 6 depicts the schematic example in which the critical surface 108 is positioned next to the fit-and-finish surface 902. The nesting fixture 904 receives the critical surface 108. The work-piece 102 will be clamped (temporarily fixedly connected) to the nesting fixture 904 so that the fit-and-finish surface 902 and the critical surface 108 are within acceptable tolerance relative to each other.

Figure 7:
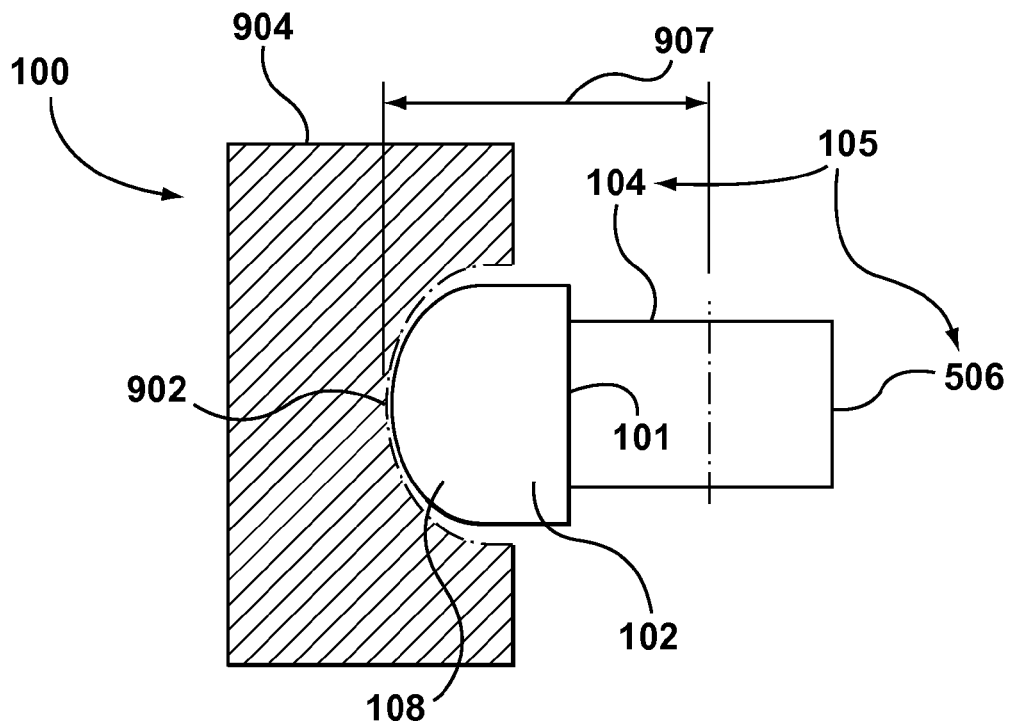
Figure 9:
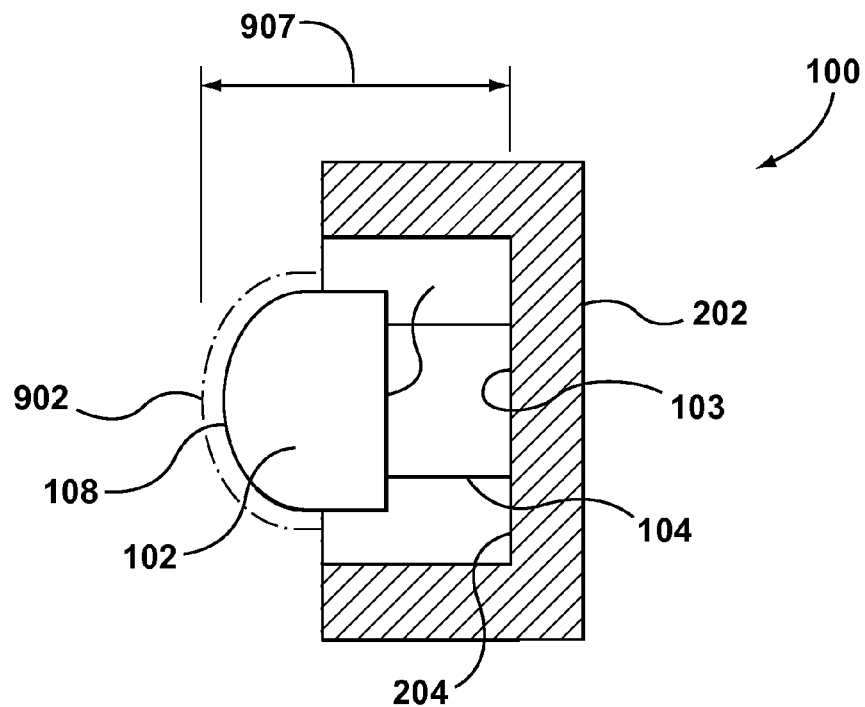

FIG. 7 depicts the schematic example in which a target distance 907 is used to identify a potential adjustment may be made to the unadjusted datum 105. The potential adjustment to the unadjusted datum 105 is such that once the work-piece 102 and the mating structure 202 (as depicted in FIG. 9) are installed together, the fit-and-finish surface 902 and the critical surface 108 are within acceptable tolerance relative to each other. The potential adjustment to the unadjusted datum 105 may include (for example) the removal of a sacrificial portion 506 (also called a material) to be removed from the unadjusted datum 105. The datum 104 was manufactured as a result of removing the sacrificial portion 506 from the unadjusted datum 105. A material-manipulation tool (not depicted) may be used to adjust the unadjusted datum 105. The amount of material to be removed (adjusted) from the unadjusted datum 105 is enough to permit acceptable tolerance between the critical surface 108 and the fit-and-finish surface 902 once the work-piece 102 is installed to the mating structure 202.

Figure 8:
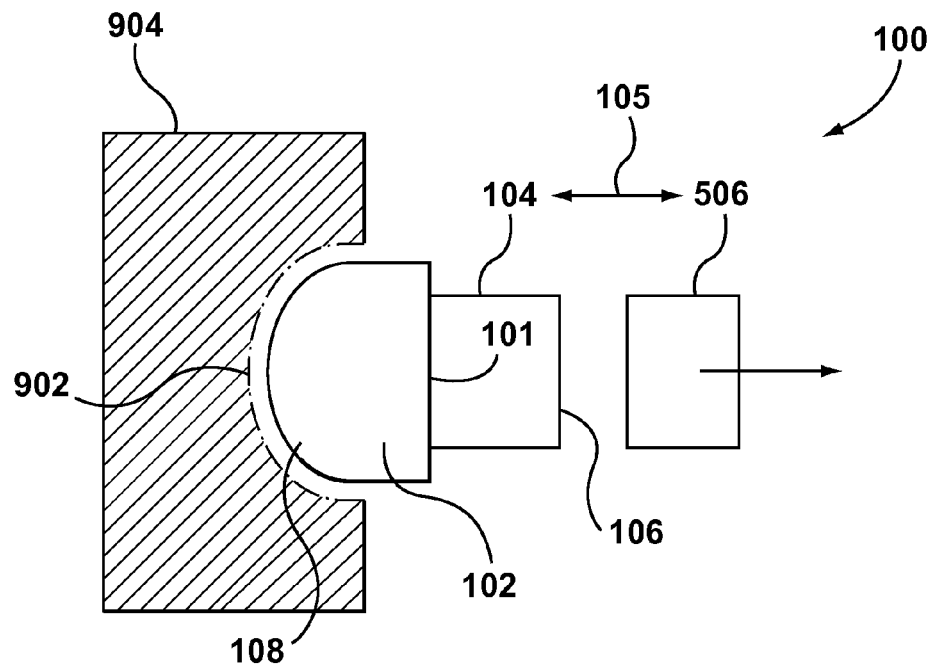

FIG. 8 depicts the schematic example in which the unadjusted datum 105 is cut (adjusted) so as to leave behind the datum 104 and the sacrificial portion 506 that is removed or separated. It will be appreciated that material may be added to the unadjusted datum 105 if so required and if so possible in order to form or manufacture the datum 104. The datum 104 may be called the adjusted datum. It will be appreciated that the datum 104 may include an x-axis datum, a y-axis datum and a z-axis datum. A single instance of the datum 104 is depicted for the sake of simplification of describing the example.

In view of FIGS. 7 and 8, there is provided (depicted) a method. The method is for installing the work-piece 102 to the mating structure 202. The method includes an operation (A). The operation (A) includes adjusting the datum 104 of the work-piece 102 in such a way that the datum 104, once so adjusted, provides a datum feature 106. The datum feature 106 is depicted in FIG. 8 as a surface feature. The datum feature 106 is provided within acceptable tolerance. The datum feature 106 is positionable against the datum interface 204—which is depicted in FIG. 9—of the mating structure 202 in such a way that the datum interface 204 is set apart from the fit-and-finish surface 902 and from the critical surface 108 of the work-piece 102 within acceptable tolerance once the datum feature 106 is so positioned against the datum interface 204. The datum feature 106 and the datum interface 204 cooperate with each other in such a way that once the work-piece 102 is installed to the mating structure 202, a critical surface 108 of the work-piece 102 is within acceptable tolerance relative to a fit-and-finish surface 902 associated with the critical surface 108.

In view of FIGS. 7 and 8 (in accordance with an option), there is provided the apparatus 100 that includes a combination of the mating structure 202 and the work-piece 102. The mating structure 202 has a datum interface 204. The work-piece 102 has a critical surface 108 and a datum 104. The datum 104 is adjusted in such a way that the datum 104, once so adjusted, provides the datum feature 106 within acceptable tolerance. The datum feature 106 is positionable against the datum interface 204 of the mating structure 202 in such a way that the datum interface 204 is set apart from a fit-and-finish surface 902 and from the critical surface 108 within acceptable tolerance once the datum feature 106 is so positioned against the datum interface 204.

In view of FIGS. 7 and 8 (in accordance with another option), there is provided the apparatus 100 for use with the mating structure 202 that has a datum interface 204. The apparatus 100 includes the work-piece 102 without the mating structure 202. The work-piece 102 has the combination of the critical surface 108 and the datum 104.

In view of FIGS. 7 and 8 (in accordance with yet another option), there is provided the apparatus 100 for use with the mating structure 202 that has the datum interface 204. The apparatus 100 is also for use with the work-piece 102 that has a critical surface 108. The apparatus 100 includes a datum 104 and does not include the mating structure 202 and the work-piece 102; that is, the datum 104 is provided (in this case) as a separate item to be combined with the work-piece 102.

In view of FIGS. 7 and 8, it will be appreciated that in general terms in accordance with a general example, the apparatus 100 includes the combination of the work-piece 102, the mating structure 202 and the datum 104. The datum 104 and the first portion 101 are interfaced with the work-piece 102. The datum 104 also has a second portion 103—as depicted in FIG. 9—interfaced with the mating structure 202. The datum 104 is adjusted in such a way that the datum 104 facilitates placement of the critical surface 108 within acceptable tolerance to the fit-and-finish surface 902 once the datum 104 is placed between the work-piece 102 and the mating structure 202, and the work-piece 102 is installed to the mating structure 202.

In view of the first general example, it will be appreciated that another option is such that the apparatus 100 includes the datum 104 without the combination of the work-piece 102 and the mating structure 202.

In view of the first general example, it will be appreciated that another option is such that the apparatus 100 includes the combination of the datum 104 and the work-piece 102, without the mating structure 202.

In view of the first general example, it will be appreciated that another option is such that the apparatus 100 includes the combination of the datum 104 and the mating structure 202 without the work-piece 102.

In view of the first general example, there is provided a method for use with the work-piece 102 and with the mating structure 202. The method includes the combination of: operation (A), operation (B), and operation (C). Operation (A) includes interfacing a first portion 101 of a datum 104 with the work-piece 102. Operation (B) includes interfacing a second portion 103—which is depicted in FIG. 9—of the datum 104 with the mating structure 202. Operation (C) includes adjusting the datum 104 in such a way that the datum 104 facilitates placement of the critical surface 108 within acceptable tolerance to the fit-and-finish surface 902 once (i) the datum 104 is placed between the work-piece 102 and the mating structure 202, and (ii) the work-piece 102 is installed to the mating structure 202.

According to a variation, the work-piece 102 includes a vehicle assembly, such as a headlight assembly for example, and the mating structure 202 includes a vehicle (car or truck). According to a specific variation, the datum 104 includes a plastic material configured to be adjusted. It will be appreciated that the datum 104 may include any adjustable material (metal, plastic, etc.).

FIG. 9 depicts the schematic example in which the work-piece 102 is installed to the mating structure 202 with the datum 104 placed between the work-piece 102 and the mating structure 202. The datum 104 is configured to reduce (at least in part) errors (manufacturing errors) associated with stack-up errors (manufacturing components and/or assembling component on component for example) that leads to the critical surface 108 to not be within acceptable tolerance to the fit-and-finish surface 902.

In view of FIGS. 6, 7, 8, and 9, there is provided a method. The method is for installing the work-piece 102 to the mating structure 202. The method includes a combination of operation (A), operation (B) and operation (C). Operation (A) is associated with FIG. 6. Operation (A) includes positioning, within acceptable tolerance, the critical surface 108 of the work-piece 102 against the fit-and-finish surface 902 of the nesting fixture 904 in such a way that the critical surface 108 is acceptably oriented relative to the fit-and-finish surface 902 once so positioned. Operation (B) is associated with FIGS. 7 and 8. Operation (B) includes adjusting (once the critical surface 108 is positioned and acceptably oriented relative to the fit-and-finish surface 902) the datum 104 of the work-piece 102 in such a way that the datum 104, once so adjusted, provides within acceptable tolerance. The datum feature 106 is depicted in FIG. 8. Operation (C) is associated with FIG. 9. Operation (C) includes positioning the datum feature 106 against the datum interface 204 of the mating structure 202 in such a way that the datum interface 204 is set apart from the fit-and-finish surface 902 and from the critical surface 108 within acceptable tolerance once the datum feature 106 is so positioned against the datum interface 204. The datum feature 106 and the datum interface 204 cooperate with each other in such a way that once the work-piece 102 is installed to the mating structure 202, a critical surface 108 of the work-piece 102 is within acceptable tolerance relative to a fit-and-finish surface 902 associated with the critical surface 108.

In view of FIGS. 6, 7, 8, and 9, there is provided the apparatus 100 in which the apparatus 100 includes a combination of the mating structure 202 and the work-piece 102. The mating structure 202 has a datum interface 204. The work-piece 102 has the combination of the critical surface 108 and the datum 104. The critical surface 108 is positionable, within acceptable tolerance, against the fit-and-finish surface 902 of the nesting fixture 904 in such a way that the critical surface 108 is acceptably oriented relative to the fit-and-finish surface 902 once so positioned. The datum 104 has a datum feature 106. The datum 104 is adjustable, once the critical surface 108 is positioned and acceptably oriented relative to the fit-and-finish surface 902, in such a way that the datum 104, once so adjusted, provides the datum feature 106 within acceptable tolerance. The datum feature 106 is positioned against the datum interface 204 of the mating structure 202 in such a way that the datum interface 204 is set apart from the fit-and-finish surface 902 and from the critical surface 108 within acceptable tolerance once the datum feature 106 is so positioned against the datum interface 204.

In view of FIGS. 6, 7, 8, and 9, there is provided the apparatus 100 for use with the mating structure 202 having the datum interface 204. The apparatus 100 includes the work-piece 102, and does not include the mating structure 202.

In view of FIGS. 6, 7, 8, and 9, there is provided the apparatus 100 for use with the mating structure 202 having the datum interface 204, and for use with the work-piece 102 having the critical surface 108. The apparatus 100 includes the datum 104, and does not include the work-piece 102 and the mating structure 202.

In view of FIGS. 6, 7, 8, and 9, there is provided the apparatus 100 for use with the mating structure 202 and with the work-piece 102. The work-piece 102 has the critical surface 108 and has the datum interface 204. The apparatus 100 includes the datum 104 without the mating structure 202 and without the work-piece 102. The datum 104 is configured to be attached to the mating structure 202 so as to extend from the mating structure 202. The datum 104 is also configured to be adjusted in such a way that the datum 104, once so adjusted, provides a datum feature 106 within acceptable tolerance. The datum feature 106 is positionable against the datum interface 204 of the work-piece 102 in such a way that the datum interface 204 is set apart from a fit-and-finish surface 902 and from the critical surface 108 within acceptable tolerance once the datum feature 106 is so positioned against the datum interface 204.

Figure 10:
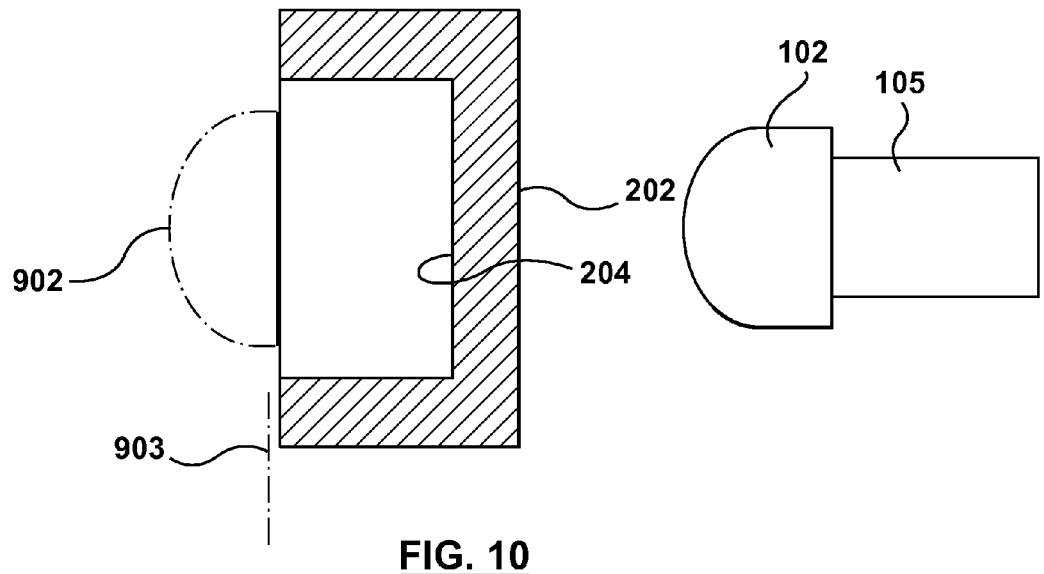

FIG. 10 depicts the schematic example in which the mating structure 202 is associated with a corresponding fit-and-finish surface 903 along with the fit-and-finish surface 902 of the work-piece 102. The example of FIG. 10 is such that the mating structure 202 is properly positioned relative to the corresponding fit-and-finish surface 903, and the alignment or placement of the fit-and-finish surface 902 and the corresponding fit-and-finish surface 903 are within tolerance relative to each other. FIG. 10 depicts an ideal condition.

Figure 11:
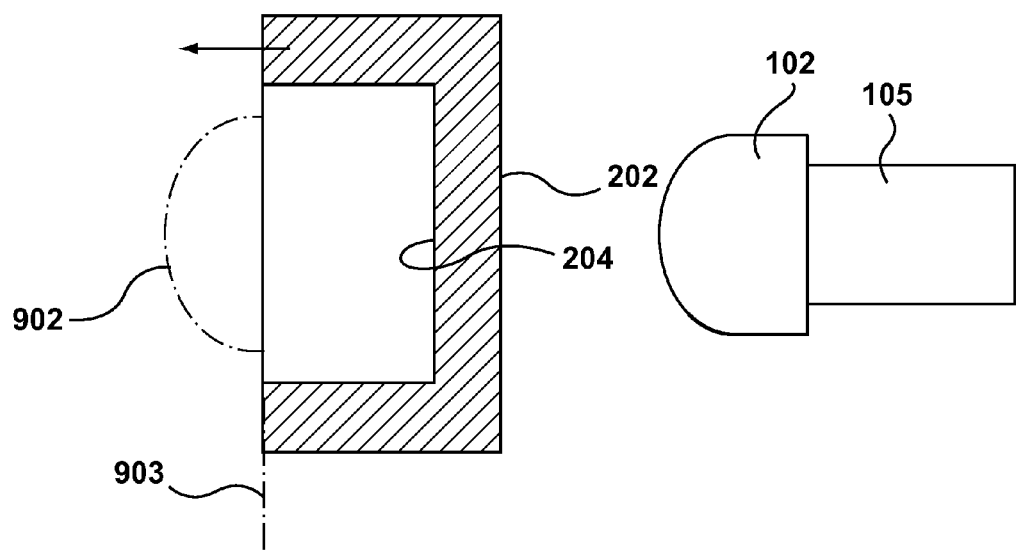

FIG. 11 depicts the example in which the mating structure 202 is not properly positioned relative to the corresponding fit-and-finish surface 903, and the mating structure 202 cannot be moved or repositioned because the mating structure 202 is fixedly connected to its surrounding environment of components. The mating structure 202 is pushed forwardly toward (positioned relative to) the corresponding fit-and-finish surface 903. For this case, the mating structure 202 has unacceptable tolerances that cannot be changed and must be accepted as is without further amendments to the mating structure 202 relative to the corresponding fit-and-finish surface 903. However, it may be desirable to maintain and/or adjust the relationship between the fit-and-finish surface 902 of the work-piece 102 relative to the corresponding fit-and-finish surface 903 of the mating structure 202.

Figure 12:
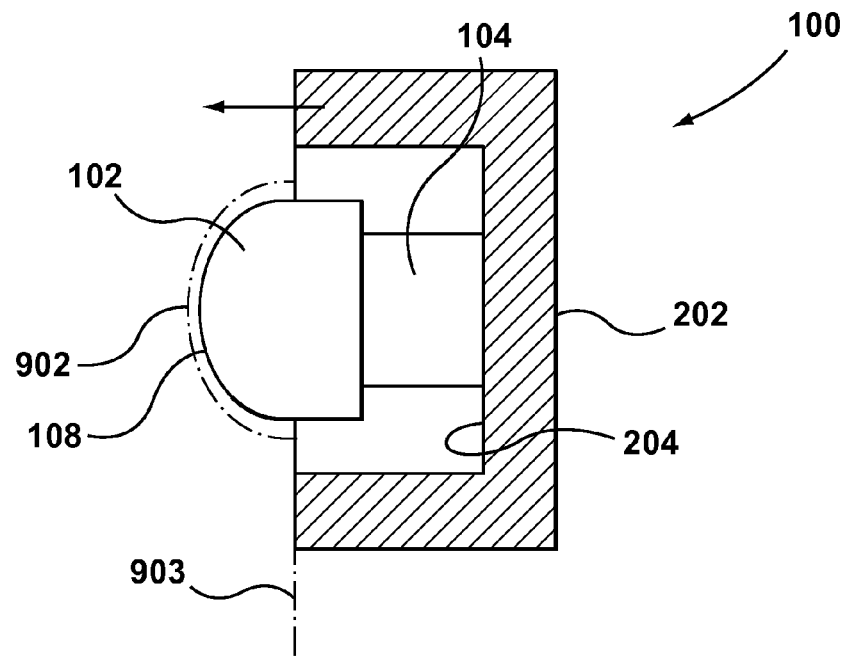

FIG. 12 depicts the schematic example in which the requirement is to maintain the relationship between the fit-and-finish surface 902 of the work-piece 102 relative to the corresponding fit-and-finish surface 903 of the mating structure 202. The datum 104 was adjusted (such as, by having material removed from an unadjusted datum 105) in such a way as to maintain the relationship between the fit-and-finish surface 902 of the work-piece 102 relative to the corresponding fit-and-finish surface 903 of the mating structure 202.

For the case (not depicted) where the requirement is to change the relationship between the fit-and-finish surface 902 relative to the corresponding fit-and-finish surface 903, the datum 104 is adjusted in such a way as to facilitate (permit) the required change in the relationship between the fit-and-finish surface 902 relative to the corresponding fit-and-finish surface 903, as may be needed.

Figure 13:
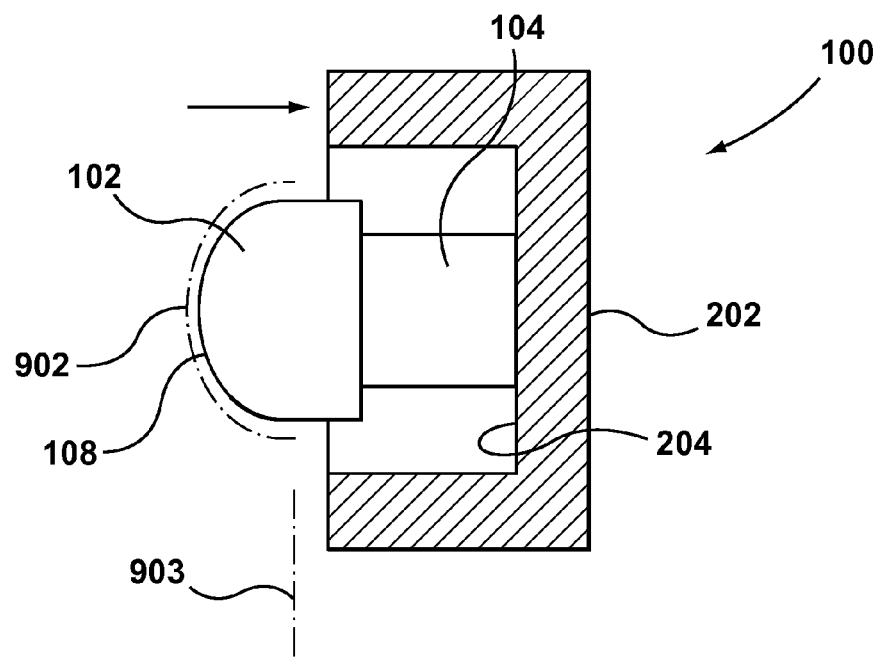

FIG. 13 depicts the schematic example in which the mating structure 202 is positioned further away from the corresponding fit-and-finish surface 903. Once again, the mating structure 202 cannot be relocated or repositioned since it is now fixedly connected to its surrounding environment. The datum 104 was adjusted (such as, by having material removed from an unadjusted datum 105) in such a way as to maintain the relationship between the fit-and-finish surface 902 of the work-piece 102 relative to the corresponding fit-and-finish surface 903 of the mating structure 202.

FIGS. 14A, 14B, 14C, 15A, 15B, 15C, 16A, 16B, 16C depict example representations of adjusting the unadjusted datum 105 of the work-piece 102 so as to form the datum 104 of FIG. 8.

Figure 14A:
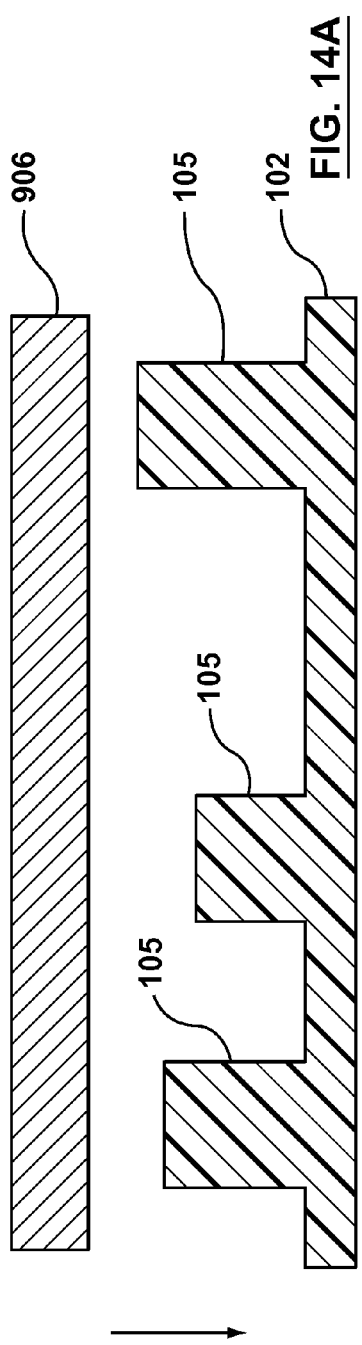

FIG. 14A depicts the schematic example of a tool system 906 configured to adjust the instances of the unadjusted datum 105 extending from the work-piece 102. The work-piece 102 includes a plastic material, and the tool system 906 includes a hot plate. The tool system 906 will be moved so as to abut against the unadjusted datum 105, causing the unadjusted datum 105 to be adjusted or re-melted at least in part.

Figure 14B:
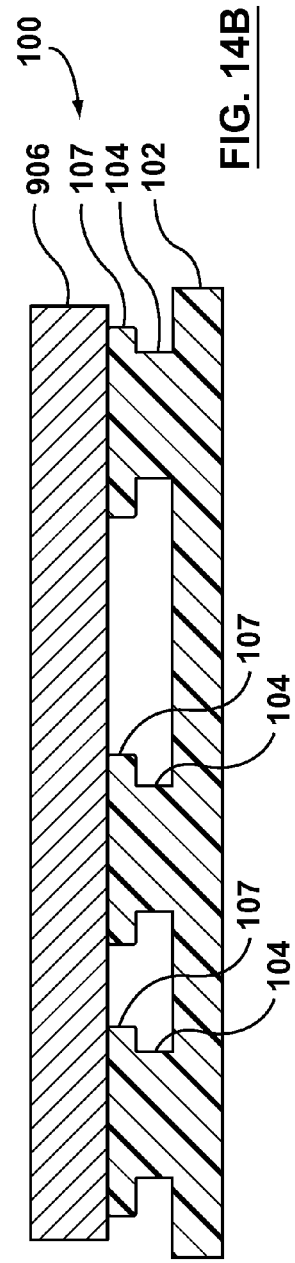

FIG. 14B depicts the schematic example of the tool system 906 positioned in such a way that a melted portion 107 is formed and extends from the datum 104 (as adjusted, to an adjusted width greater than the unadjusted width as seen in FIG. 14A). Once so formed or adjusted, the tool system 906 is retracted away from the work-piece 102.

Figure 14C:
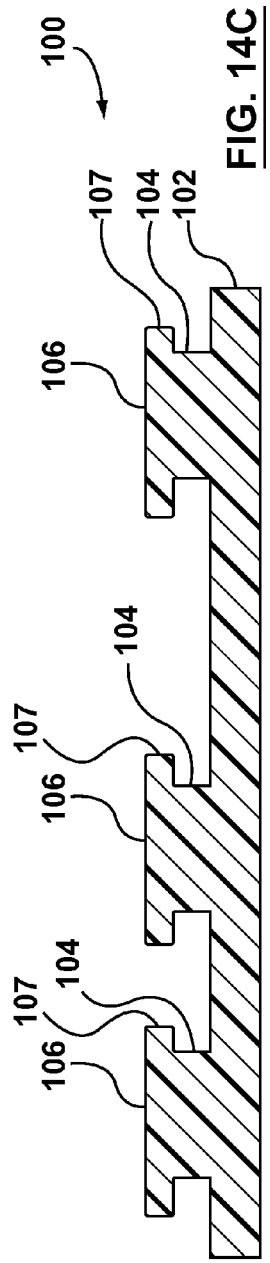

FIG. 14C depicts the schematic example showing the datum feature 106 of the datum 104 (as adjusted) extending from the work-piece 102, and the melted portion 107 surrounds the datum feature 106. The datum feature 106 will be placed against the mating structure 202 of FIG. 8 once the work-piece 102 is installed to the mating structure 202. The datum feature 106 includes a flat planar surface.

FIG. 15A depicts the schematic example of the tool system 906 configured in such a way so as to adjust the unadjusted datum 105 extending from the work-piece 102. The work-piece 102 includes a plastic material, and the tool system 906 includes the hot plate. The tool system 906 will be moved so as to abut against the unadjusted datum 105, thus causing the unadjusted datum 105 to be adjusted or re-melted at least in part, resulting in at least a portion remaining unadjusted after the datum is adjusted.

FIG. 15B depicts the schematic example of the tool system 906 positioned in such a way that a melted portion 107 is formed and extends from the datum 104. Once so formed or adjusted, the tool system 906 is retracted away from the work-piece 102.

FIG. 15C depicts the schematic example showing the datum feature 106 of the datum 104 (as adjusted) extending from the work-piece 102, and the melted portion 107 surrounds the datum feature 106. The datum feature 106 will be placed against the mating structure 202 of FIG. 8 once the work-piece 102 is installed to the mating structure 202. The datum feature 106 includes an outer surface of a cylindrical post extending from the datum 104 and also includes a flat planar surface surrounding the outer surface of the cylindrical post.

FIG. 16A depicts the schematic example of the tool system 906 configured in such a way so as to adjust the unadjusted datum 105 extending from the work-piece 102. The work-piece 102 includes a plastic material, and the tool system 906 includes a drill device. The tool system 906 will be moved so as to abut against the unadjusted datum 105, and then drill, at least in part, into the unadjusted datum 105.

FIG. 16B depicts the schematic example of the tool system 906 positioned in such a way that the drill device has drilled into the datum 104. Once so formed or adjusted, the tool system 906 is retracted away from the work-piece 102.

FIG. 16C depicts the schematic example showing the datum feature 106 of the datum 104 (as adjusted) extending from the work-piece 102. The datum feature 106 includes an inner facing surface positioned in a hole defined by the datum 104 wherein an inner portion of the datum 104 (at the data feature 106) has a length which is less than the unadjusted length of the datum 104.

Example

To make a headlight assembly of a vehicle, a housing and lens are separately molded. The datum may be positioned on the molded housing, and the housing and lens are glued together. Processes stack up the molding variation of the housing and the lens with the variation associated with (for example) gluing and assembly. The sum of these variances (or tolerances) will not allow for relatively small design gaps (for example) of 1.5 mm (millimeters) or more (as may be permitted or tolerated).

Plastic parts, or the work-piece 102, and assemblies, due to molding and assembly process variations, may not be able to meet the required tolerances. Initially, the work-piece 102 may be molded or assembled. The work-piece 102 may then be located and clamped to the fit-and-finish surface 902. A material adjustment tool (such as a hot plate, broach, cutter, robot-controlled tool, or other tooling) is used to adjust a datum. The adjusted datum helps to reduce variation and creates a direct and adjustable link between the controlled surfaces. The locating and nesting of the work-piece may be (for example) less than 0.2 mm (millimeters), and the material manipulation (adjustment) tool may be less than 0.05 mm (for example). The total stack-up may then be less than 0.3 mm of variation. The stacked-up variations may be reduced by creating (forming, manufacturing) the datum off of the fit-and-finish surface 902. Adjustment of the datum also allows for improved adjustment or tuning of dimensions associated with the work-piece and/or mating structure. This approach may include locating one side of a dimension of a critical surface 108 with the fit-and-finish surface 902, and then forming (adjusting) the datum with tooling. The distance between the datum and the fit and finish surface is too far as a result of errors due to stack up (for example, molding variations and/or gluing variations).

After the part is assembled and the critical surface 108 is located, a hot plate tool (a broach, cutter or some other tooling) is used to form the final (adjusted) datum. Extra material and relief areas for the displaced material may be required in the original molded part. The tooling may cut away the extra material or press the material into relief areas, leaving the newly formed (adjusted) datum. The hot plate tool may include a non-stick surface or coating so that the thermal range may be determined by material being displaced.

The above describes ways in which to produce (manufacture) work-piece 102 such as plastic parts, having a better fit by locating the datum directly from the fit-and-finish surface 902 of the work-piece 102. The work-piece 102 may include several individual parts (e.g., housing and lens). Each of these parts may have molding variations that, when stacked up (combined) after assembly, contribute to a less than desirable fit. Gluing together of such parts may also contribute to a less than desirable fit. The datum for such components are not typically located on the fit-and-finish surface 902. For example, the datum for a headlamp assembly may be located on a housing. Initially, the work-piece 102 is manufactured (such as molding a desired part, etc.). The work-piece 102 is clamped to an associated assembly/component such as the nesting fixture 904, and the work-piece 102 is positioned in the nesting fixture 904 such that the fit-and-finish surface 902 is properly located. Initial (or unadjusted) datum (e.g., pin structures) are formed (on the external part of the housing) relative to the fit-and-finish surface 902. The initial datum may include excess plastic material as well as associated relief areas (for example). Tooling (such as a hot plate, broach or cutter) is then used to produce (form, adjust) the initial datum so as to provide an adjusted datum (within an acceptable tolerance); this may be accomplished by (for example) either cutting away extra material from the datum pins or pressing it into relief areas, thus leaving a newly formed (adjusted) datum (such as a datum surface). The formed datum may be used to ensure that the critical surface 108 of the work-piece 102 may be properly located once the work-piece 102 is assembled to the mating structure 202. This approach may improve the overall fit and finish quality of the work-piece 102 once mated to a mating structure.

For example, the process or method may include an operation (A) includes: creating a correct part datum (adjusting the datum) by manufacturing the work-piece 102 (such as molding a desired part). An operation (B) includes subsequently clamping the work-piece 102 to an associated fixture (such as the nesting fixture 904) with the work-piece 102 positioned in such a way that the critical surface 108 is located relative to the fit-and-finish surface 902 within acceptable tolerance. An operation (C) includes removing excess material (adjusting the datum) from the unadjusted datum 105 (such as pins) that extend from the work-piece 102 to leave a newly formed (adjusted) datum or datum 104. The newly formed (adjusted) datum reflects an improved positioning of the critical surface 108 of the work-piece 102 relative to the fit-and-finish surface 902 once the work-piece 102 is installed to the mating structure 202. The above concepts describe a way to manufacture the work-piece 102 in such a way that the work-piece 102 has a better (improved) fit by locating (adjusting) the datum directly from the critical surface 108 of the work-piece 102 relative to fit-and-finish surface 902. For example, a headlamp assembly includes several individual parts (e.g., housing and lens). Each of these parts may have molding variations that, when stacked up (combined) after assembly, contribute to a less than desirable fit. Gluing together of such parts may also contribute to a less than desirable fit. The datum for such components are not typically located relative to the fit-and-finish surface 902 associated with the work-piece 102. For example, the datum for a headlamp assembly are located on the housing. For the headlight assembly, initially the headlight assembly is molded, then the molded part is clamped to an associated assembly/component (nest fixture having the fit-and-finish surface 902) with the molded part positioned such that the critical surface 108 of the work-piece 102 is positioned relative to the fit-and-finish surface 902 within acceptable tolerance. Initial or unadjusted datum 105 (e.g., pins) is formed relative to the fit-and-finish surface 902, and include excess plastic material as well as associated relief areas. Tooling is then used to produce (form) datum having improved accuracy (within tolerance) by either cutting away extra material from the unadjusted datum 105 (unadjusted pins), or pressing the unadjusted datum 105 into relief areas leaving a newly formed (adjusted) datum 104 that may be used to ensure that the critical surface 108 of the work-piece 102 is located relative to the fit-and-finish surface 902 once or when the work-piece 102 is installed to the mating structure 202.

It will be appreciated that any material adjustment process may be used to form the datum, including adding material and/or removing material.

It may be appreciated that the assemblies and modules described above may be connected with each other as may be required to perform desired functions and tasks that are within the scope of persons of skill in the art to make such combinations and permutations without having to describe each and every one of them in explicit terms. There are no particular assemblies, components that are superior to any of the equivalents available to the art. There is no particular mode of practicing the disclosed subject matter that is superior to others, so long as the functions may be performed. It is believed that all the crucial aspects of the disclosed subject matter have been provided in this document. It is understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is noted that the foregoing has outlined the non-limiting embodiments (examples). The description is made for particular non-limiting embodiments (examples). It is understood that the non-limiting embodiments are merely illustrative as examples.

While certain exemplary embodiments of the present invention are described in detail above, the scope of the invention is not to be considered limited by such disclosure, and modifications are possible without departing from the spirit of the invention as evidenced by the following claims:

What is claimed is:

1. An apparatus, comprising:
a work-piece having a critical surface associated with a fit-and-finish surface;
a mating structure; and
a datum having:
a first portion interfaced with the work-piece; and
a second portion interfaced with the mating structure;
wherein, the datum is adapted by melting for adjustment in such a way that the datum facilitates placement of the critical surface within acceptable tolerance to the fit-and-finish surface once the datum is placed between the work-piece and the mating structure, and the work-piece is installed to the mating structure.

2. The apparatus of claim 1, wherein the work-piece includes a vehicle assembly and the mating structure includes a vehicle.

3. The apparatus of claim 1, wherein the datum includes a plastic material configured to be adjusted.

4. The apparatus of claim 1, wherein:
the mating structure is associated with a corresponding fit-and-finish surface;
the mating structure is not properly positioned relative to the corresponding fit-and-finish surface;
the mating structure cannot be repositioned and is fixedly connected to a surrounding environment;
the mating structure is positioned relative to the corresponding fit-and-finish surface in such a way that the mating structure has unacceptable tolerance which cannot be changed and must be accepted as is without further amendments to the mating structure relative to the corresponding fit-and-finish surface; and
the datum is adjusted in such a way as to maintain the relationship between the fit-and-finish surface of the work-piece relative to the corresponding fit-and-finish surface of the mating structure.

5. The apparatus of claim 1, wherein the datum is manufactured as a result of reshaping by the melting of an unadjusted datum.

6. An apparatus, comprising:
a datum having:
a first portion configured to interface with a work-piece having a critical surface associated with a fit-and-finish surface; and
a second portion configured to interface with a mating structure and having an unadjusted width;
wherein, the second portion is adjusted to a width greater than the unadjusted width in such a way that the datum facilitates placement of the critical surface within acceptable tolerance to the fit-and-finish surface once the datum is placed between the work-piece and the mating structure, and the work-piece is installed to the mating structure.

7. The apparatus of claim 6, wherein the work-piece includes a vehicle assembly and the mating structure includes a vehicle.

8. The apparatus of claim 6, wherein the datum includes a plastic material configured to be adjusted.

9. The apparatus of claim 6, wherein:
the mating structure is associated with a corresponding fit-and-finish surface;
the mating structure is not properly positioned relative to the corresponding fit-and-finish surface;
the mating structure cannot be repositioned and is fixedly connected to a surrounding environment;
the mating structure is positioned relative to the corresponding fit-and-finish surface in such a way that the mating structure has unacceptable tolerance which cannot be changed and must be accepted as is without further amendments to the mating structure relative to the corresponding fit-and-finish surface; and
the datum is adjusted in such a way as to maintain the relationship between the fit-and-finish surface of the work-piece relative to the corresponding fit-and-finish surface of the mating structure.

10. The apparatus of claim 6, wherein the second portion has an end region, at least a portion of the end region remaining unadjusted after the datum is adjusted.

11. The apparatus of claim 6, wherein the datum has an unadjusted length and an adjusted length, an inner portion of the datum having a length which is less than the unadjusted length.

12. An apparatus, comprising:
a work-piece having a critical surface associated with a fit-and-finish surface; and
a datum having:
a first portion interfaced with the work-piece; and
a second portion configured to interface with a mating structure and having an unadjusted width;
wherein, the datum is adapted by melting the second portion to a width greater than the unadjusted width for adjustment in such a way that the datum facilitates placement of the critical surface within acceptable tolerance to the fit-and-finish surface once the datum is placed between the work-piece and the mating structure, and the work-piece is installed to the mating structure.

13. The apparatus of claim 12, wherein the work-piece includes a vehicle assembly and the mating structure includes a vehicle.

14. The apparatus of claim 12, wherein the datum includes a plastic material configured to be adjusted.

15. The apparatus of claim 12, wherein:
the mating structure is associated with a corresponding fit-and-finish surface;
the mating structure is not properly positioned relative to the corresponding fit-and-finish surface;
the mating structure cannot be repositioned and is fixedly connected to a surrounding environment;
the mating structure is positioned relative to the corresponding fit-and-finish surface in such a way that the mating structure has unacceptable tolerance which cannot be changed and must be accepted as is without further amendments to the mating structure relative to the corresponding fit-and-finish surface; and
the datum is adjusted in such a way as to maintain the relationship between the fit-and-finish surface of the work-piece relative to the corresponding fit-and-finish surface of the mating structure.

16. An apparatus, comprising:
a mating structure; and
a datum having:
a first portion configured to interface with a work-piece having a critical surface associated with a fit-and-finish surface; and
a second portion interfaced with the mating structure;
wherein, the datum is adapted by melting for adjustment in such a way that the datum facilitates placement of the critical surface within acceptable tolerance to the fit-and-finish surface once the datum is placed between the work-piece and the mating structure, and the work-piece is installed to the mating structure.

17. The apparatus of claim 16, wherein the work-piece includes a vehicle assembly and the mating structure includes a vehicle.

18. The apparatus of claim 16, wherein the datum includes a plastic material configured to be adjusted.

19. The apparatus of claim 16, wherein the datum is created by removing a sacrificial portion from an unadjusted datum.

20. The apparatus of claim 16, wherein:
the mating structure is associated with a corresponding fit-and-finish surface;
the mating structure is not properly positioned relative to the corresponding fit-and-finish surface;
the mating structure cannot be repositioned and is fixedly connected to a surrounding environment;
the mating structure is positioned relative to the corresponding fit-and-finish surface in such a way that the mating structure has unacceptable tolerance which cannot be changed and must be accepted as is without further amendments to the mating structure relative to the corresponding fit-and-finish surface; and
the datum is adjusted in such a way as to maintain the relationship between the fit-and-finish surface of the work-piece relative to the corresponding fit-and-finish surface of the mating structure.

* * * * *